United States Patent
Ullner

[19]

[11] Patent Number: 6,112,288
[45] Date of Patent: Aug. 29, 2000

[54] DYNAMIC CONFIGURABLE SYSTEM OF PARALLEL MODULES COMPRISING CHAIN OF CHIPS COMPRISING PARALLEL PIPELINE CHAIN OF PROCESSORS WITH MASTER CONTROLLER FEEDING COMMAND AND DATA

[75] Inventor: Michael Ullner, Pasadena, Calif.

[73] Assignee: Paracel, Inc., Pasadena, Calif.

[21] Appl. No.: 09/081,267

[22] Filed: May 19, 1998

[51] Int. Cl.[7] .................................................... G06F 15/80
[52] U.S. Cl. ............................... 712/20; 712/15; 712/32; 707/6
[58] Field of Search ................................. 712/17, 18, 19, 712/11, 22, 15, 20, 32; 707/6

[56] References Cited

U.S. PATENT DOCUMENTS

| | | | |
|---|---|---|---|
| 4,636,948 | 1/1987 | Gdaniec et al. ........................ | 709/106 |
| 4,760,523 | 7/1988 | Yu et al. ..................................... | 707/7 |
| 4,837,676 | 6/1989 | Rosman ..................................... | 712/21 |
| 4,873,626 | 10/1989 | Gifford ..................................... | 710/120 |
| 4,891,787 | 1/1990 | Gifford ..................................... | 712/205 |
| 4,905,143 | 2/1990 | Takahashi et al. ........................ | 712/11 |
| 5,051,947 | 9/1991 | Messenger et al. ........................ | 707/3 |
| 5,127,092 | 6/1992 | Gupta et al. ............................. | 712/234 |
| 5,371,896 | 12/1994 | Gove et al. ................................ | 712/20 |
| 5,396,641 | 3/1995 | Iobst et al. ............................... | 713/100 |
| 5,475,856 | 12/1995 | Kogge ....................................... | 712/20 |
| 5,535,410 | 7/1996 | Watanabe et al. ........................ | 712/20 |
| 5,613,146 | 3/1997 | Gove et al. ................................ | 712/20 |
| 5,632,041 | 5/1997 | Peterson et al. .......................... | 712/16 |
| 5,649,135 | 7/1997 | Pechanek et al. ....................... | 712/200 |
| 5,706,498 | 1/1998 | Fujimiya et al. ........................... | 707/6 |

OTHER PUBLICATIONS

Parallel Sequence Comparison and Alignment; by Richard Hughey et al. pp. 1–11.

*Primary Examiner*—Kenneth S. Kim
*Attorney, Agent, or Firm*—Blakely Sokoloff Taylor & Zafman

[57] ABSTRACT

A programmable, special-purpose, pipeline processing system for processing dynamic programming algorithms. The pipeline processing system includes a plurality of accelerator chips coupled in series. The first and last accelerator chips are coupled to interface logic. Each of the accelerator chips includes an instruction processor; a plurality of pipeline processor segments coupled in series. Each of the pipeline processor segments includes a plurality of pipeline processors coupled in series. Each of the pipeline processors has an output and has as one input an output from a preceding pipeline processor and, as a set of second inputs, a corresponding set of outputs from the instruction processor. Also provided is a result processor having an output, and having as one input, an output from a prior result processor, and, as a second input, the output from one of the plurality of pipeline processors.

23 Claims, 14 Drawing Sheets

DYNAMIC CONFIGURABLE SYSTEM OF PARALLEL MODULES COMPRISING CHAIN OF CHIPS COMPRISING PARALLEL PIPELINE CHAIN OF PROCESSORS WITH MASTER CONTROLLER FEEDING COMMAND AND DATA

SUMMARY OF THE INVENTION

The present invention is directed to a programmable, special-purpose, pipeline processor that has been optimized to perform certain dynamic programming algorithms. Dynamic programming algorithms are typically used in the comparison of genetic sequences. Such sequences are represented as strings of characters, and the problem is to compare two such sequences $x[i]$ for $i=1, \ldots, m$ and $y[j]$ for $j=1, \ldots, n$. The result is a matrix of scores $H[i,j]$ for $i=1, \ldots, m$ and $j=1, \ldots, n$ that characterizes the similarity of the two sequences. An element $H[i,j]$ of the score matrix is computed as a function of the corresponding elements of the two sequences and prior elements of the score matrix:

$$H[i, j] = f(x[i], y[j], H[i-1, j],$$

$$H[i-2, j], \ldots H[i-1, j-1], H[i-2, j-2], \ldots)$$

Special boundary values are used instead of scores that fall outside the matrix:

$H[i,j]$=Boundary value if $i<1$ or $j<1$.

The function used to compute an element of the score matrix is comprised of simple arithmetic operations: addition, subtraction, and comparison. Dynamic programming is used to perform a variety of optimization algorithms.

In a simple dynamic programming algorithm, the score at a given position (i) in a query string (x) relative to a position (j) in a database string (y) might be defined as follows.

$$H[i, j] = \max(H[i-1, j] + Del,$$

$$H[i-1, j-1] +$$

$$Sub[x[i], y[i]], H[i, j-1] + Ins, 0)$$

where $H[i,j]$=0 if $i<1$ or $j<1$.

Del and Ins are scores associated with deleting or inserting a character in the database sequence relative to the query sequence. For example, these two scores might both be equal to −1. Sub [a,b] is the score associated with substituting character a in the database sequence for character b in the query sequence. Typically, the substitution score is represented as a table containing one row and one column for each letter in the alphabet used in the query and database strings. For example, the substitution score matrix

|   | a  | b  | c  | d  |
|---|----|----|----|----|
| a | 1  | −1 | −1 | −1 |
| b | −1 | 1  | −1 | −1 |
| c | −1 | −1 | 1  | −1 |
| d | −1 | −1 | −1 | 1  | represents a substitution score of 1 when the query character at any position matches the database character. A substitution score of −1 is assigned otherwise.

Using this simple dynamic programming algorithm, for a sample query comprising the string <a b a c c> and a sample database comprising the string <a c d a c c b>, the score matrix H would be computed as follows.

|   | a | c | d | a | c | c | b |
|---|---|---|---|---|---|---|---|
| a | 1 | 0 | 0 | 1 | 0 | 0 | 0 |
| b | 0 | 0 | 0 | 0 | 0 | 0 | 1 |
| a | 1 | 0 | 0 | 1 | 0 | 0 | 0 |
| c | 0 | 2 | 1 | 0 | 2 | 1 | 0 |
| c | 0 | 1 | 1 | 0 | 1 | 3 | 2 |

This table shows that the best score occurs when position 5 of the query is aligned with position 6 of the database. A local maximum occurs when query position 4 is aligned with database position 2.

In performing a search in the present invention, query and penalty scoring information, along with the specific dynamic programming algorithm to be executed, are loaded into the accelerator hardware prior to performing a search function. Database characters are then shifted through the pipeline and each pipeline processing cell computes a portion of the score matrix based on the database character at its input and the query and penalty score information loaded in its memory. Other portions of the accelerator hardware detect maximal scores and return results containing these scores back to the user.

DETAILED DESCRIPTION OF THE INVENTION

Figure 1:
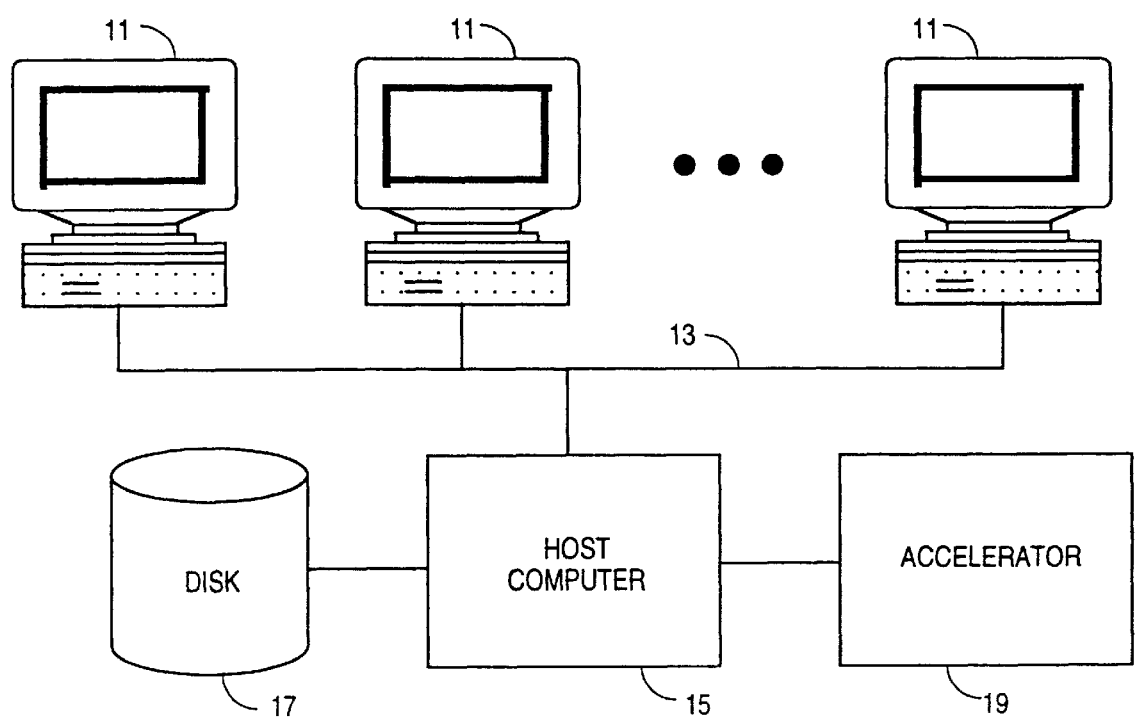
FIG. 1: Typical dynamic programming accelerator system configuration.

FIG. 1 shows a typical accelerator system comprising one or more client computers or workstations 11, an interconnection network 13, a host computer 15 with disk storage unit 17, and the accelerator hardware 19. Client computers are commercial off-the-shelf (COTS) products that execute software that prepares the various parameters and microcode needed by the accelerator. The clients send this information to the COTS host computer via the COTS interconnection network 13. The host computer executes server software that queues client requests and services those requests as accelerator hardware is available. Data needed by the accelerator can be stored on a COTS disk 17 attached to the host computer 15 as shown in FIG. 1.

Figure 2:
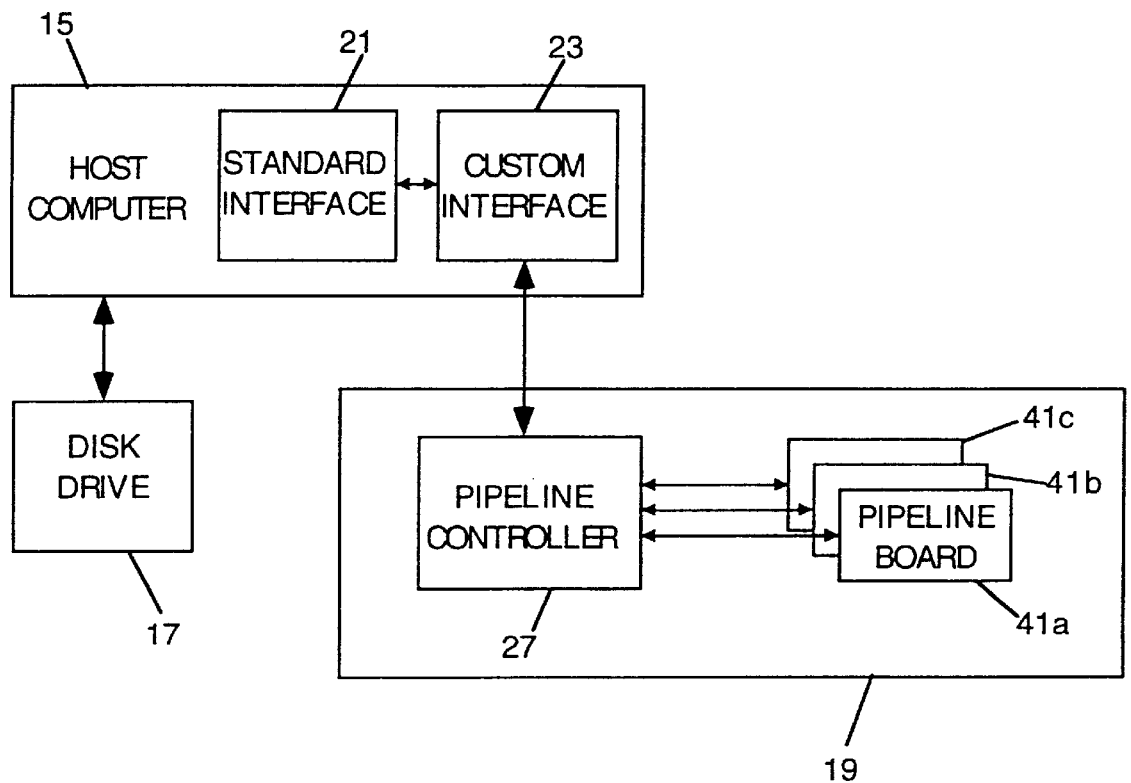
FIG. 2: Typical accelerator/host computer configuration.
Figure 5:
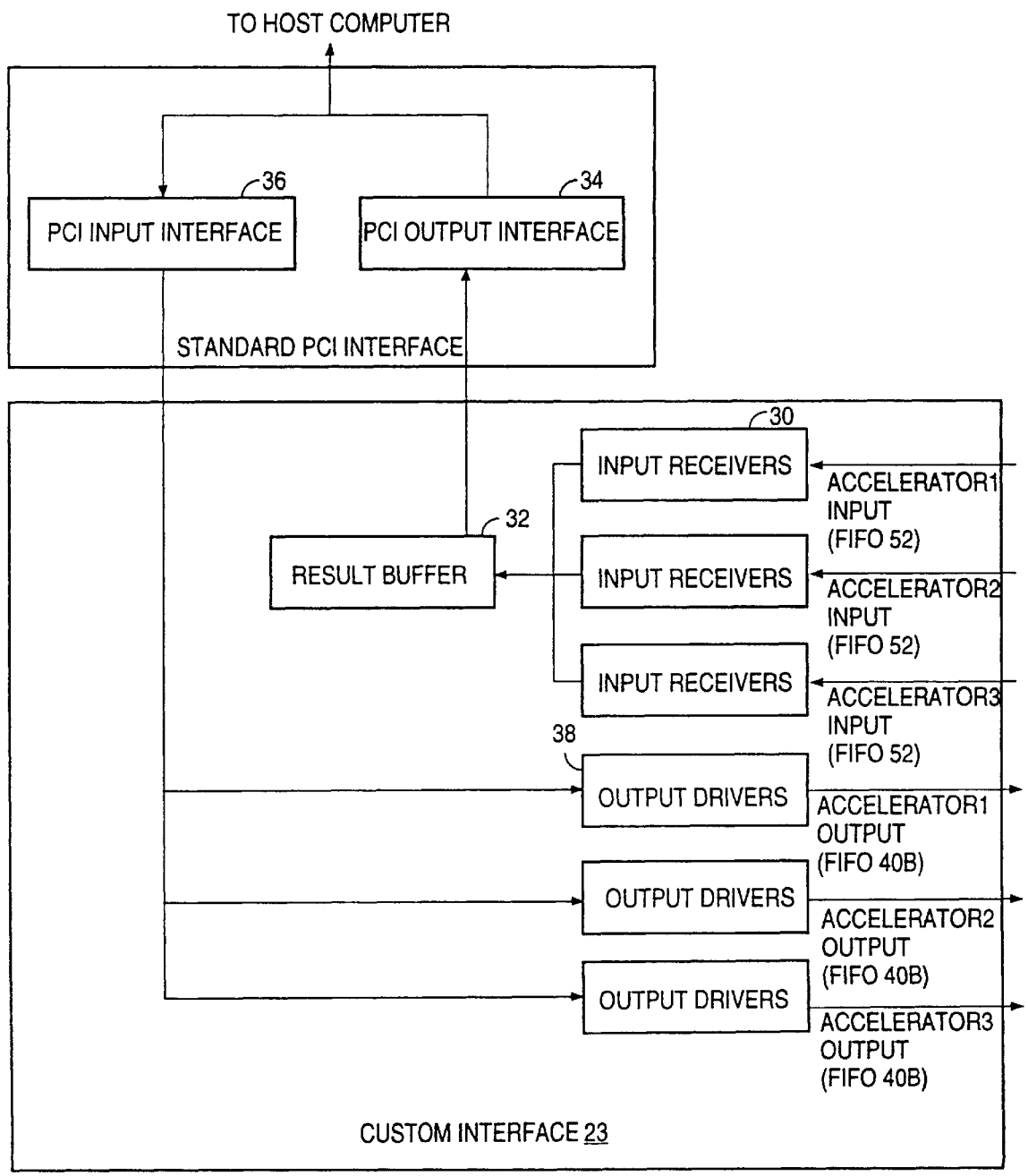
FIG. 5: Host computer to pipeline controller interface.

As shown in FIG. 2, the host computer contains an industry standard interface 21 such as PCI, which provides input and output buffering and signal conditioning, to a custom accelerator interface 23. The custom interface provides the link between the host computer and a pipeline interface controller (PCON) 27 within an accelerator 19. The custom interface provides signal conditioning for the pipeline data and control signals. FIG. 5 shows an embodiment of a suitable custom interface 23 capable of connecting up to three accelerators 19 to a host computer. Input receivers 30 receive pipe inputs from each connected accelerator 19 (see FIGS. 2 and 3) through FIFO 52. A result buffer 32 then provides the received pipe input to PCI output interface 34. PCI input interface 36 receives pipe commands, microcode and database characters which are provided to output drivers 38 for making the received data available to the pipe out FIFOs 40b in a pipeline controller 27.

Through the standard interface 21, the host computer sends two types of information to the custom interface 23: control information for the custom interface, and data that is sent to the pipeline controller 27.

Control information sent to the custom interface configures that interface with the host computer memory addresses and word counts used in direct memory access data transfers to and from the pipeline controller 27. Additionally, the host computer sends control commands to reset the custom interface and pipeline controller as well as commands that inform the custom interface and pipeline controller that all data have been sent from the host and the pipeline and pipeline controller should collect all remaining result data and return that data to the host.

Data destined for the pipeline controller comprises: control commands for the pipeline controller, control commands for the pipeline, pipeline microcode that is loaded into the pipeline instruction memory, scoring matrix data needed by the dynamic programming algorithm which is loaded into pipeline processing cell memory, and database characters.

Commands to the pipeline controller configure whether to add padding characters (special characters used to initialize boundary conditions) as needed by a particular dynamic programming algorithm, whether and what data to collect from the pipeline (no collection, collect only hits, collect only pipeline effluent, or collect both hits and effluent), whether and how to unpack database data (data must be sent to the pipeline one data character per 32-bits transferred; databases often pack up to 16 data characters in 32-bits), whether and how to translate data characters (if data characters in databases are stored as ASCII text, these characters must be translated to one-byte integer values for use by the dynamic programming algorithms), and whether and how many times to replicate a given data word.

Pipeline control commands configure the pipeline to: shift initialization information into the result processors, shift instructions into the instruction memory, start running code stored in instruction memory, start running the result processors, and when to consume data applied at the pipeline inputs (never, each clock, when the pipeline executes any shift instruction, or when the pipeline shifts its database register).

The pipeline controller receives two distinct 32-bit wide data streams from the host computer via the custom interface. One stream, the command stream, carries commands to the pipeline controller itself. The second stream, the data stream, carries data to be searched. The command stream contains commands to configure the pipeline, to load microcode and other data into the custom chips, and to describe the format of data in the data stream. Distinguishing the control stream from the data stream separates information about the format of the data from the data itself. This, in turn, means that the system can process databases without requiring that formatting information be stored within the database. Therefore it is possible to process databases without requiring them to be reformatted specially for the accelerator.

There are also two separate pipeline output streams collected from the end of the pipeline and returned to the host computer.

One stream, the result stream, contains 32-bit values that represent the result of the accelerator.

The second stream, the pipeline drain, is used to implement a virtual pipeline. The virtual pipeline is analogous to virtual memory on a conventional computer. It is a mechanism for simulating greater capacity by swapping data to a slower medium. Here, the idea is to use memory in the host computer to help simulate a pipeline with more processors than are physically present in the system. To achieve this, the physical pipeline is programmed to behave like the first section of a longer, virtual pipeline. Computations proceed normally except that data shifted out the end of the pipeline, and which would normally be discarded, are instead captured and transmitted back to the host computer for storage. When this first pass is complete, the physical pipeline is reprogrammed to behave like the second section of the virtual pipeline. Instead of sending the database into the pipeline, however, the host will send the data that had been previously captured and stored. This process is repeated until the entire virtual pipeline has been processed.

Referring back to FIG. 3, PCON 27 manages the operation of the accelerator, sends microcode and data to the accelerator, collects results from the accelerator, and returns those results to the host computer. A typical accelerator configuration comprises one pipeline controller 27 and three pipeline boards 41. The PCON may configure these boards to run independently or as a single long pipeline. Up to three such accelerators may connect to a host computer through a single custom interface 23.

Figure 3:
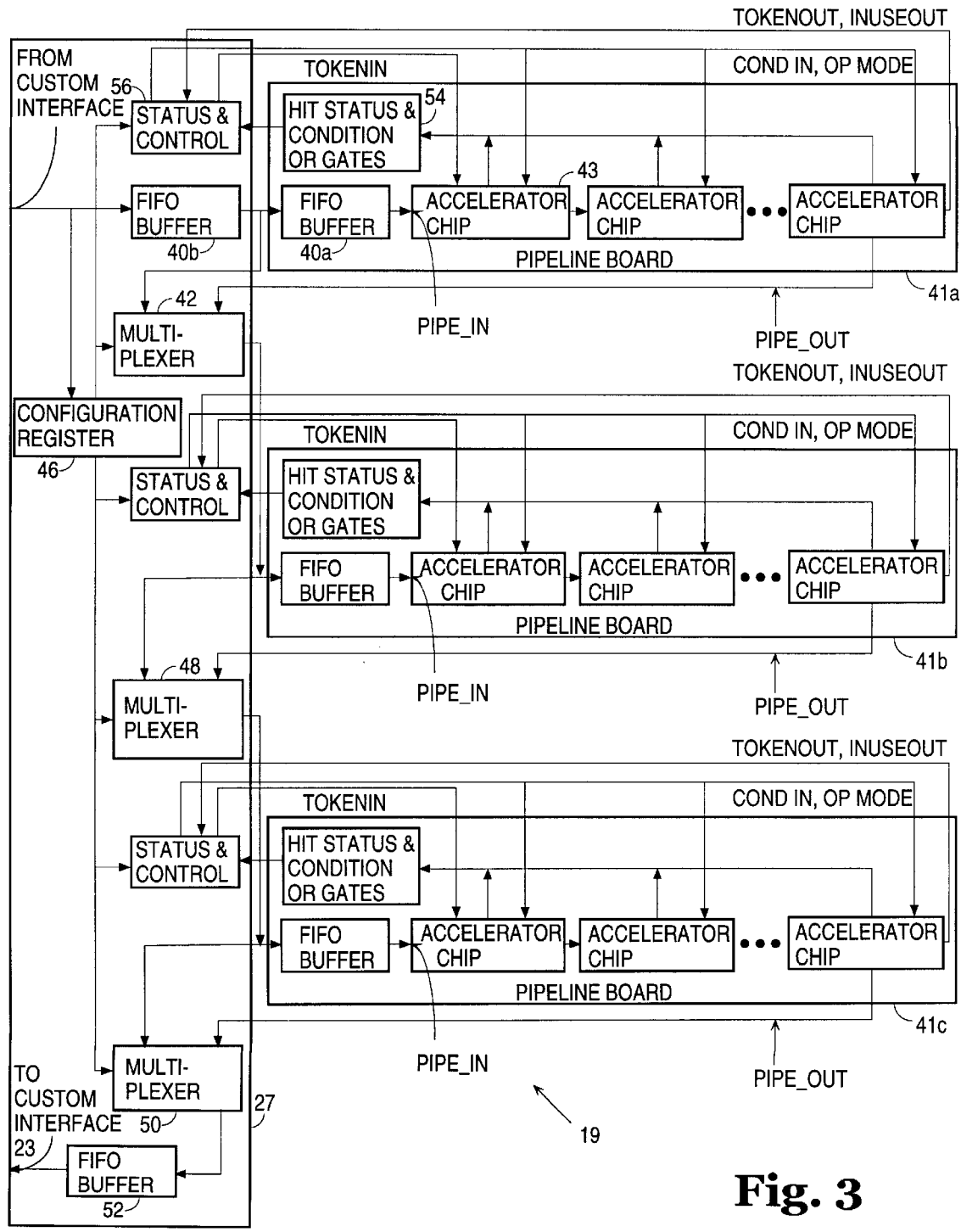
FIG. 3: Internal structure of accelerator showing accelerator chips and pipeline controller.

FIG. 3 shows the architecture of an accelerator 19 illustrated in FIG. 2. As shown, an accelerator 19 comprises three pipeline boards 41a, 41b, 41c and a single pipeline controller 27. Each board holds sixteen accelerator chips 43. Interface logic (FIFO buffer 40a) connects the first board (41a) to the pipeline controller (PCON) through FIFO buffer 40b. The last accelerator chip on this board may be connected to the first accelerator chip on the next board through a multiplexer 42 to implement a single, linked pipeline. Alternatively the boards may be operated as independent pipelines or for failure tolerance by configuring multiplexers 42, 48 and 50 to select the input from the PCON under control of configuration register 46.

FIFO buffer 40a connects the first board to the PCON through FIFO buffer 40b. The last accelerator chip on this board connects to the first accelerator chip on the next board through multiplexer 42. Similarly, the last accelerator chip on the next board connects to the first accelerator chip on the next board through multiplexer 48. The last accelerator chip on the last board connects to multiplexer 50. The output of multiplexer 50 is provided to FIFO buffer 52 which is coupled to custom interface 23.

Each pipeline board collects hit status and condition signals from each accelerator chip. These signals are OR'd together on the board in the Hit Status and Condition OR Gate module 54. A board level condition signal (CondIn) is sent to all accelerator chips. This signal is used by the accelerator's internal instruction processor to determine whether to execute conditional instructions.

Status and Control 56 on the PCON is programmed by configuration register 46 to collect hits based on the hit status signals. Hits may be collected whenever an accelerator chip's internal memory contains at least one hit, when the memory is 75% full, or when the memory is entirely full. Normally, the PCON will be configured to collect hits when the accelerator hit memory is 75% full.

Figure 6A:
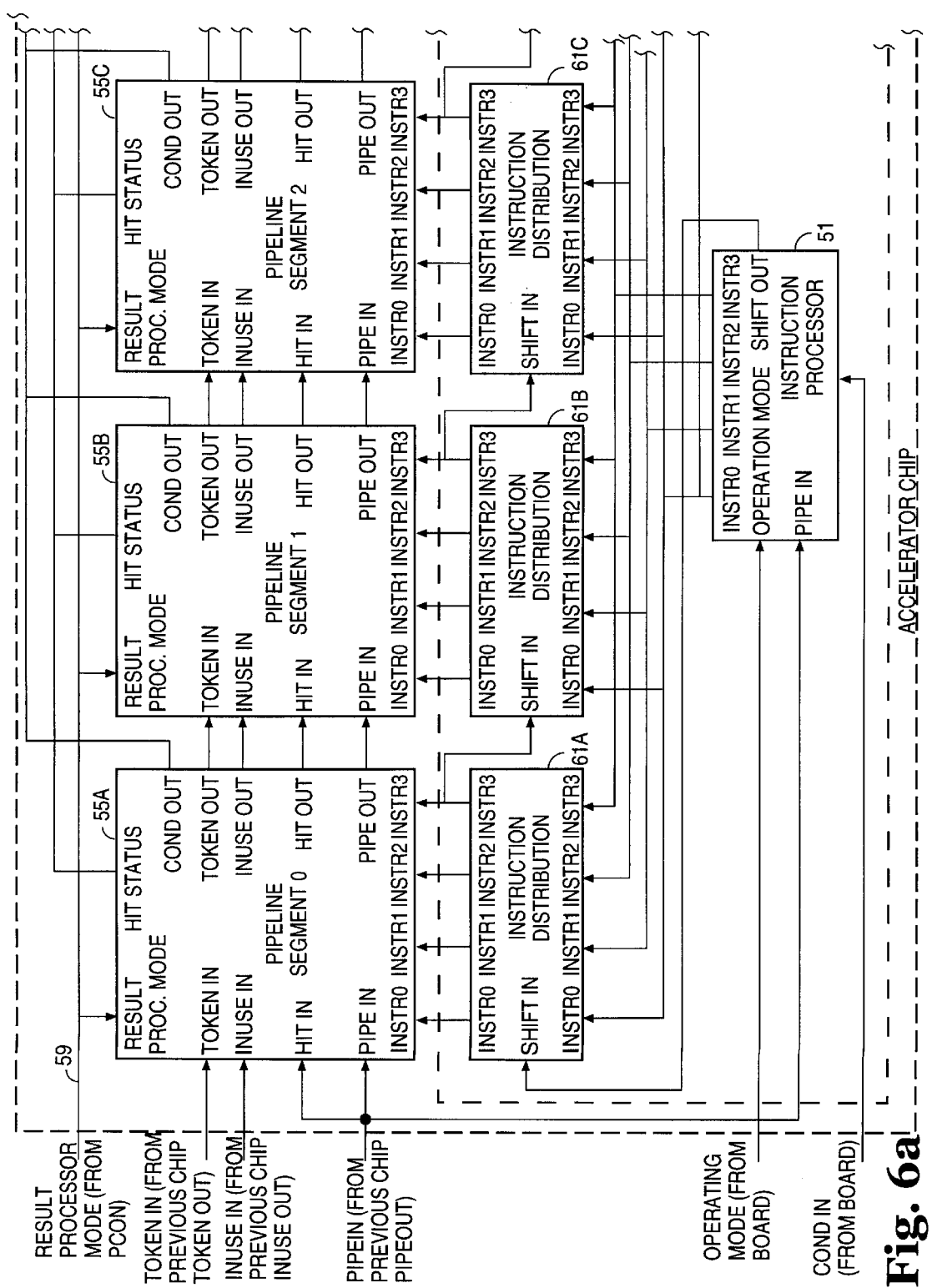
FIGS. 6a–6b: Accelerator chip block diagram.
Figure 6B:
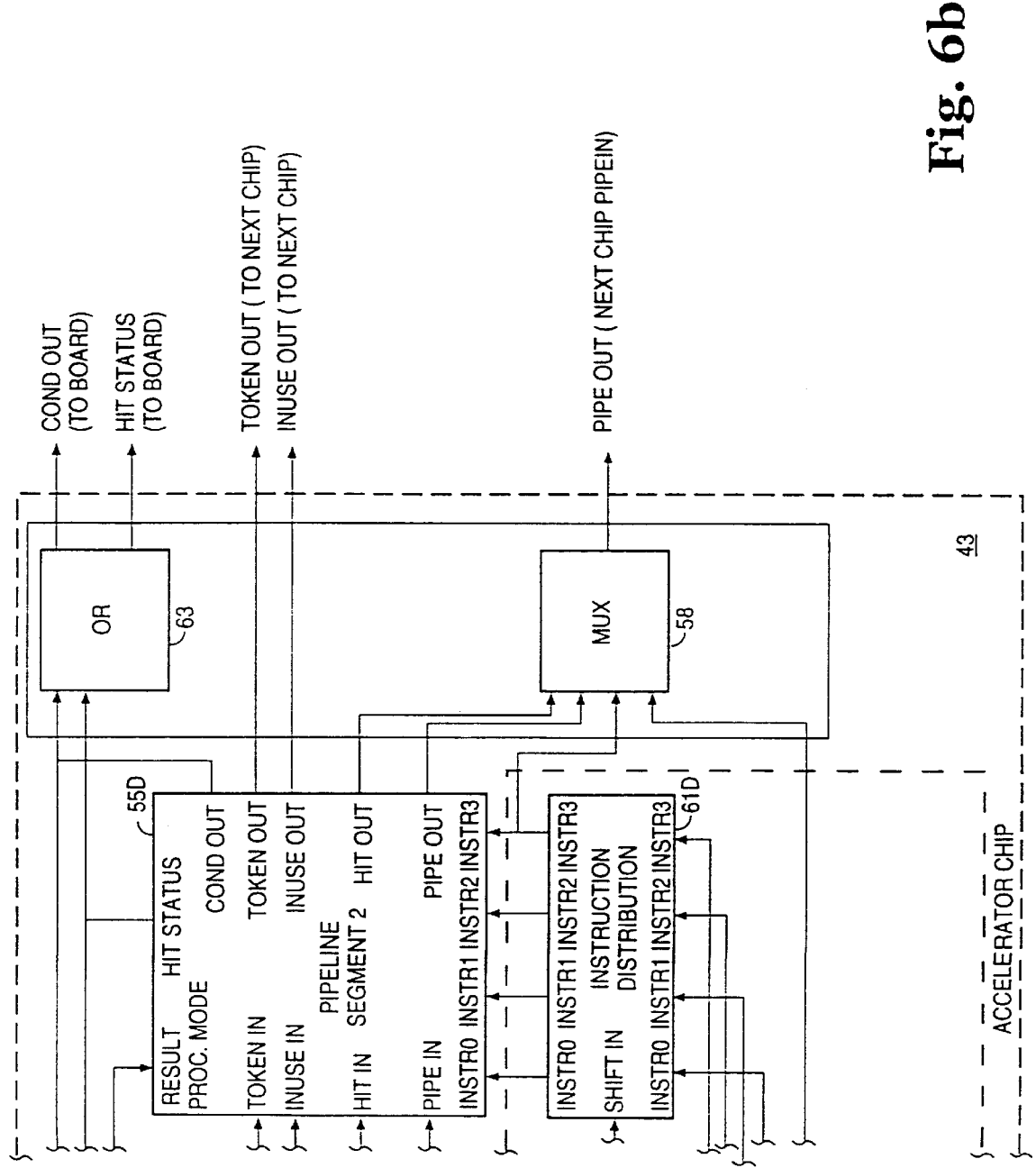

To collect hits, the PCON terminates data output to the pipeline, switches the result processor in the pipeline to hit collection mode, places the accelerator's pipeline into standby, and signals the first chip in the pipeline to output hits by asserting TokenIn (see FIGS. 6a–6b). TokenIn signals the first chip that it has permission to place hits on the pipeline if any hits are available in its memory. If a chip has hits, it asserts InUseOut to the next chip. The next chip uses this signal to distinguish hit data from padding that passes through its shift registers. Hit data are available when the PCON observes InUseOut from the last chip in the pipeline. The PCON uses the terminal InUseOut to store hit data for subsequent transmission to the custom interface.

A chip asserts TokenOut to the next chip in the pipeline when it has accepted TokenIn from the prior chip and its own internal hit memory is empty. The "token" is passed from chip to chip down the pipeline until all hits have been shifted out.

The PCON terminates hit collection when TokenOut from the final chip in the pipeline is returned. To terminate hit collection, the PCON restores the accelerator operating mode to pipeline run and result processor run.

A typical single accelerator 19 contains 48 accelerator chips (as described in detail below). A typical chip contains 48 pipeline processing cells for a typical single pipeline size of 2304 cells.

Accelerator Chip Detailed Description

Figure 4:
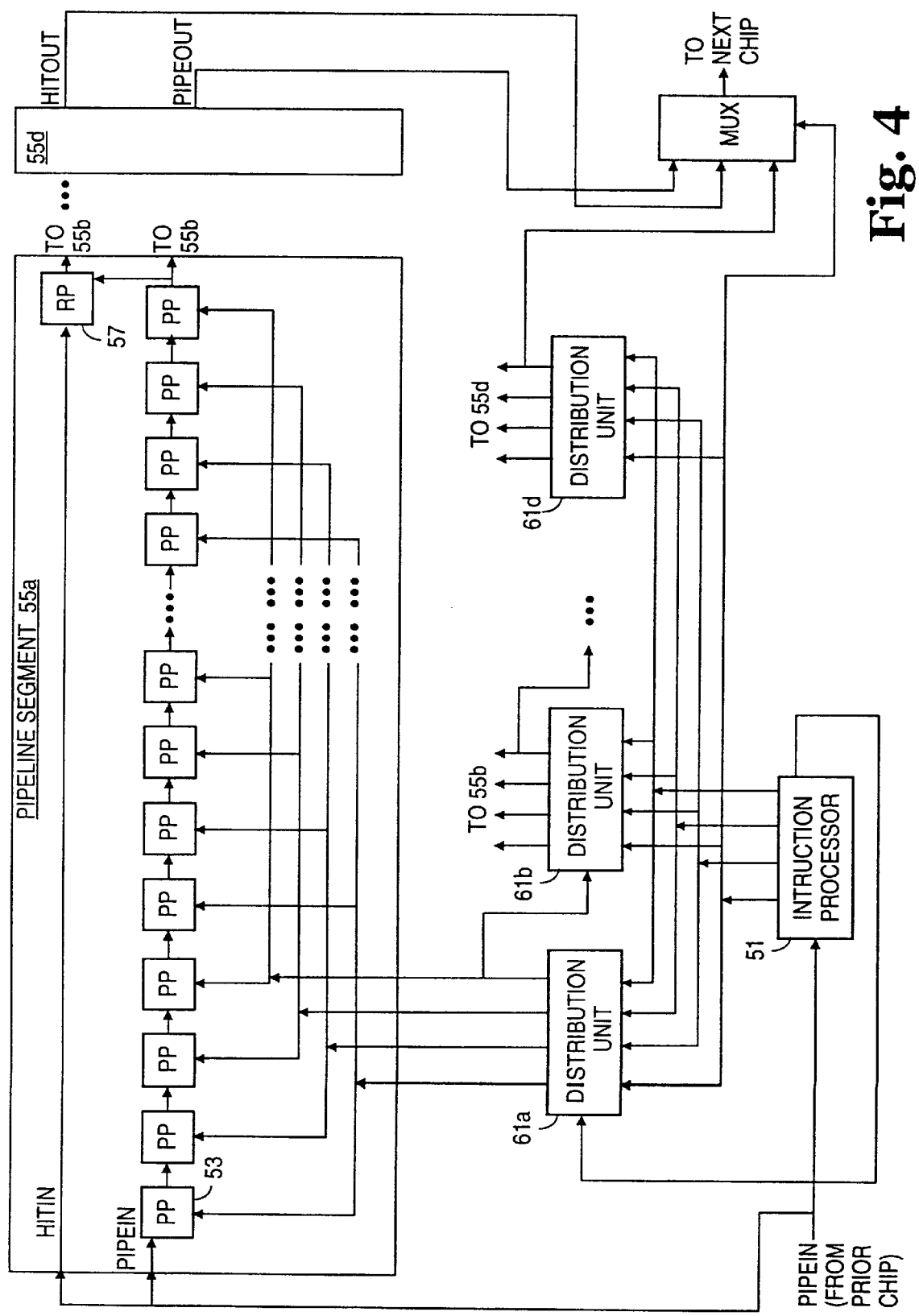
FIG. 4: Dynamic program accelerator chip block diagram.

FIG. 4 shows a functional block diagram of an accelerator chip 43. Each chip contains an instruction processor 51 (see FIGS. 7a–7b), instruction distribution units 61, pipeline processors 53 (see FIG. 9), and result processors 57 (see FIG. 10). The instruction processor (IP) executes the instructions stored in its instruction memory 67. The instruction processor may operate in single instruction, multiple data (SIMD), dual instruction, multiple data (DIMD), or quad instruction, multiple data (QIMD) mode. The instruction processor has the ability to call subroutines, invoke hardware-controlled loops, perform conditional executions, and conditional branching.

Each instruction distribution unit delivers instructions from the instruction processor to the pipeline processors. In SIMD mode, the instruction distribution units deliver a single instruction stream to the pipeline processors. In DIMD mode, they deliver two instruction streams, and in QIMD mode, they deliver four instruction streams.

Each pipeline processor (PP) contains internal RAM as well as registers for data storage. An arithmetic logic unit, referred to as the function unit, performs addition, subtraction, and several comparison functions. A number of special-purpose functions have been added to facilitate the execution of dynamic programming. For example, a single operation enables adding memory to a register and then returning the larger of that sum and the contents of the accumulator.

Intermediate results are sent from pipeline processor to pipeline processor as data are shifted in at the left as shown in FIG. 4. Result processors look at the data as it goes by and capture that data when specified trigger conditions have been met. Each result processor contains memory to store the captured hits. A result collection process is performed when result processor memory has been filled. This process requires temporarily stopping data flow through the pipeline so that results can be shifted out.

Accelerator chips are connected together to form large pipelines. Longer pipelines enable faster executions of larger computations. An accelerator chip may also be re-configured to enable more rapid processing of smaller dynamic programming problems. Moreover, the accelerator has the ability to implement an internal virtual memory scheme that extends the physical pipeline length by up to a factor of ten for a number of typical applications. The accelerator chip design also provides for an external virtual mode of operation that moves intermediate result storage to the memory in the host computer thereby creating an arbitrary length pipeline.

Referring to FIGS. 6a–6b, the inputs to each accelerator chip are TokenIn, InUseIn, PipeIn, Cond In and Operating Mode. The first three are obtained from a prior chip's outputs TokenOut, InUseOut, and PipeOut, respectively. For the first chip, the inputs are obtained from PCON 27 as shown in FIG. 3.

As shown in FIGS. 6a–6b, a typical implementation of the accelerator chip 43 comprises four pipeline segments 55a–55d. Each segment, contains 12 pipeline processing cells 53 and a result processor 57. Each chip 43 has four instruction distribution units 61a–61d and an instruction processor 51. The instruction processor 51 has storage for 256 instructions. Depending on the mode of operation, the instruction processor and instruction distribution units will either deliver the same instruction stream to all pipeline processors, one instruction stream to even-numbered pipeline processors and a second independent instruction stream to odd-numbered pipeline processors, or four different independent instruction streams interleaved such that every fourth pipeline processor receives the same instruction stream.

The board-level operating mode (signal operating mode) sent to each chip determines whether the pipeline will be idle, in instruction load mode, in instruction shift mode, in diagnostic mode, or run mode. To load instructions into a chip, the board places the chip in load mode and then serially applies instructions on the PipeIn bus of the first chip in the pipeline. The Instruction processor 51 responds to a "load program counter" command in the instruction stream to set the program counter (see FIG. 8) prior to loading instructions and after instructions have been loaded. Instructions applied to the instruction processor are loaded into instruction memory 57 and are also sent out on the instr0 output of the Instruction processor. In instruction load mode, the chip's output multiplexer 58 selects instr0 from the instruction processor thereby allowing instructions to be sent to the next chip in the pipeline.

The instruction processor's internal registers may be configured as a shift register for initialization or diagnostics. In this mode, instructions exit the Shift Out output of the instruction processor and go into the Shift Input of the leftmost instruction distribution unit 61a. This unit shifts the Instructions through to the instr3 output that connects to the Shift In of the next instruction distribution unit 61b. The chip's output multiplexer 58 selects the instr3 output of the rightmost instruction distribution unit 61c in instruction shift mode.

The result processors 57 in each pipeline segment are initialized when the result processor mode signals 59 are set to load mode as indicated by result processor mode inputs. In this mode, 32-bit PipeIn data are sent to the result processors. The result processors are placed in run mode before execution. In Run mode, the result processors compare the data being shifted through the pipeline against the collection triggers set during the initialization mode.

In pipeline run mode, the instruction processor supplies 32-bit instructions to the instruction distribution units 61a–61d, which buffer the instructions before sending them on to the pipeline segments 55a–55d. Buffering is needed to assure timing constraints are met as well as to provide sufficient drive current for the loads in the pipeline segments. A one-bit board-level Condition In signal is used by the instruction processor to respond to conditions (e.g., zero, negative, overflow, underflow) that may occur during processing. In run mode, the chip's output multiplexer 58 selects pipe out from the rightmost pipeline segment 55d.

The chip outputs hit status signals are OR'd together on each pipeline board by OR module 54. The PCON examines these signals to determine whether hit collection is necessary. To collect hits, the PCON asserts a one-bit TokenIn to the first chip in the pipeline and places all chips in hit collection mode through the result processor mode signals. When a pipeline segment receives one-bit TokenIn, it places any hit data on its 32-bit HitOut and asserts one-bit InUseOut. A pipeline segment continues to assert InUseOut until all hits have been shifted out. InUseOut of the last chip in the pipeline indicates that the 32-bit data present on the pipe outputs is hit data. When a segment has finished sending all hit data, the Segment asserts one-bit Tokenput. A pipeline segment will pass the token without asserting InUseOut if it has no hits to send. In hit collection mode, the chip output multiplexer 57 selects HitOut from the last pipeline segment 55d.

Instruction Processor

Figure 7A:
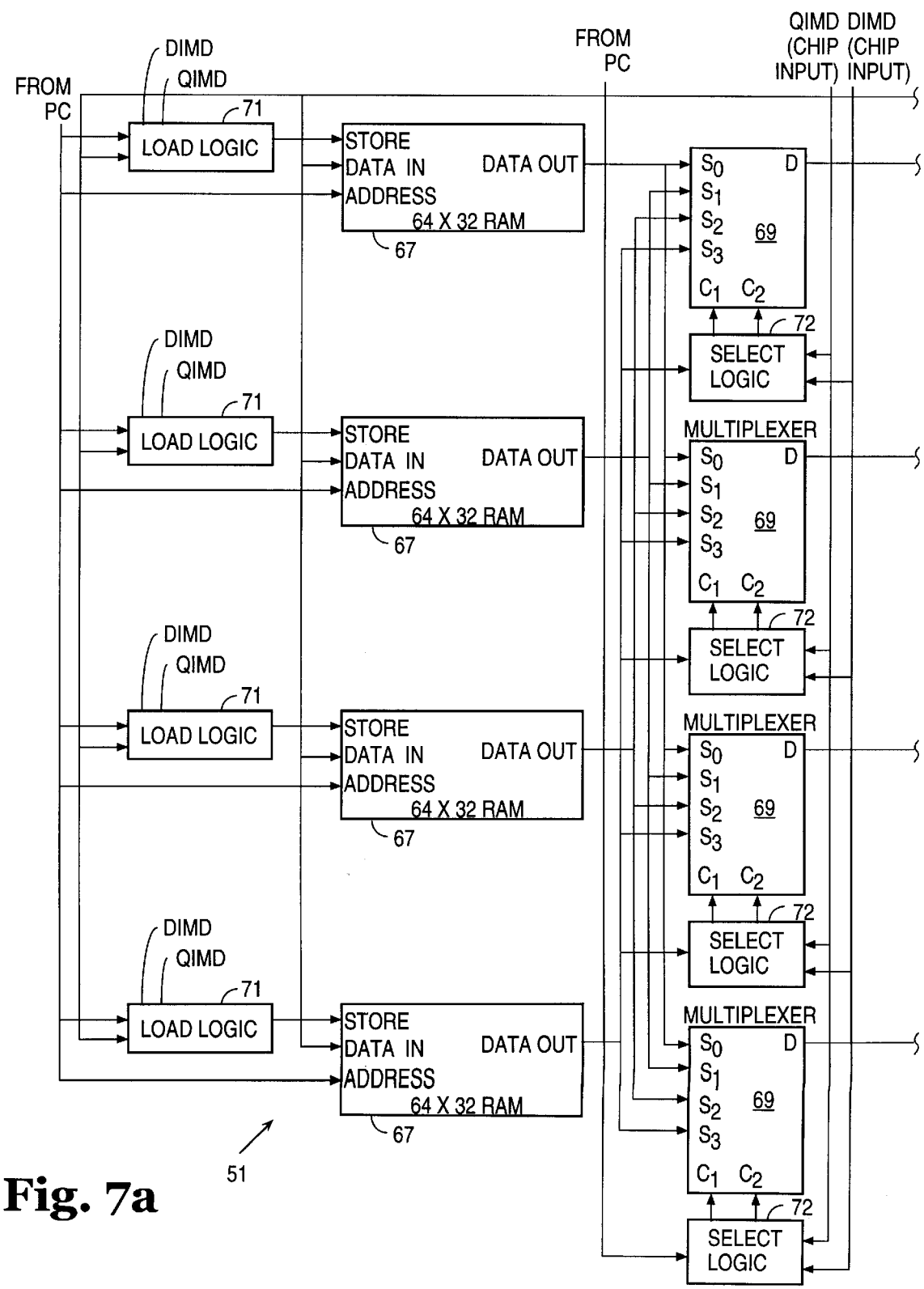
FIGS. 7a–7b: Accelerator chip instruction processor block diagram.
Figure 7B:
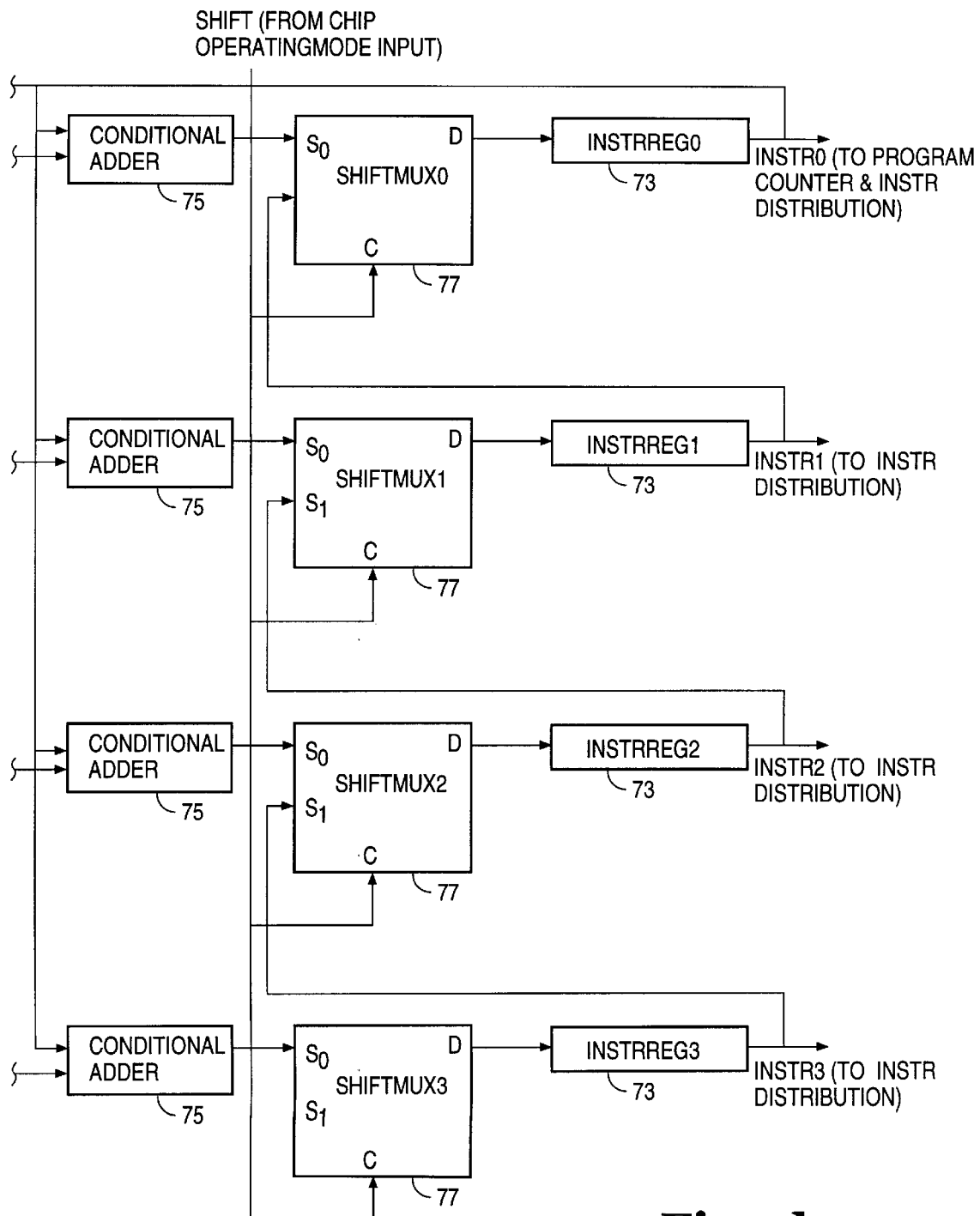

The accelerator's instruction processor 51 is illustrated in FIGS. 7a–7b. The left side of the diagram shows four 64-word instruction memories 67 connected to four multiplexers 69. Load logic 71 is used to load instructions into instruction memories 67 as a function of the value in a program counter (see FIG. 8) and operating mode SIMD (in the absence of DIMD, QIMD), DIMD or QIMD. Select logic 72 is used to fetch the next instruction(s) to be executed as a function of the program counter value and operating mode. The memory address is selected by the program counter (see FIGS. 7a–7b). The multiplexers 69 interpret the operating mode for the chip (SIMD, DIMD, or QIMD) and send the next instruction to be executed to an associated instruction register 73. An adder 75 is inserted in this path to provide for instruction offset arithmetic.

With suitable programming, DIMD and QIMD modes allow two or four processors, respectively, to divide the work of a computation step that would be performed by a single processor in SIMD mode. When sufficient processors are available, some algorithms can be programmed to run up to two or four times faster in DIMD or QIMD mode than the same algorithm programmed for SIMD mode. For smaller problems, DIMD and QIMD modes make it possible to take advantage of processors that would otherwise be idle.

When operating in SIMD mode, all multiplexors 69 select and transmit the same instruction to the corresponding instruction register 73. In DIMD mode, the multiplexors will be configured so that instruction registers 0 and 2 receive one instruction, while instruction registers 1 and 3 receive a different instruction. In QIMD mode, each instruction register will receive a different instruction. In SIMD mode, there is one instruction stream consisting of at most 256 different instructions. In DIMD mode, there are two independent instruction streams, each consisting of at most 128 different instructions. In QIMD mode, there are four independent instruction streams, each consisting of at most 64 different instructions.

In SIMD mode, the instruction processor generates one stream of instructions and all pipeline processors execute the same instruction simultaneously. In DIMD mode, the instruction processor generates two independent instruction streams. Even-numbered processors all execute an instruction from one stream, and at the same time, odd-numbered processors all execute an instruction from the other stream. In QIMD mode, the instruction processor generates four independent instruction streams. Every fourth processor executes the same instruction.

Another feature of the instruction processor is a multiplexer 77 between the offset adders 75 and the instruction register inputs. This multiplexer 77 selects instruction memory contents during execution mode, but configures the instruction registers into a shift register in instruction load mode. As shown in FIGS. 7a–7b, the output from InstrReg0 is sent to the chip output so that downstream chips may also be loaded.

Program Counter

Figure 8:
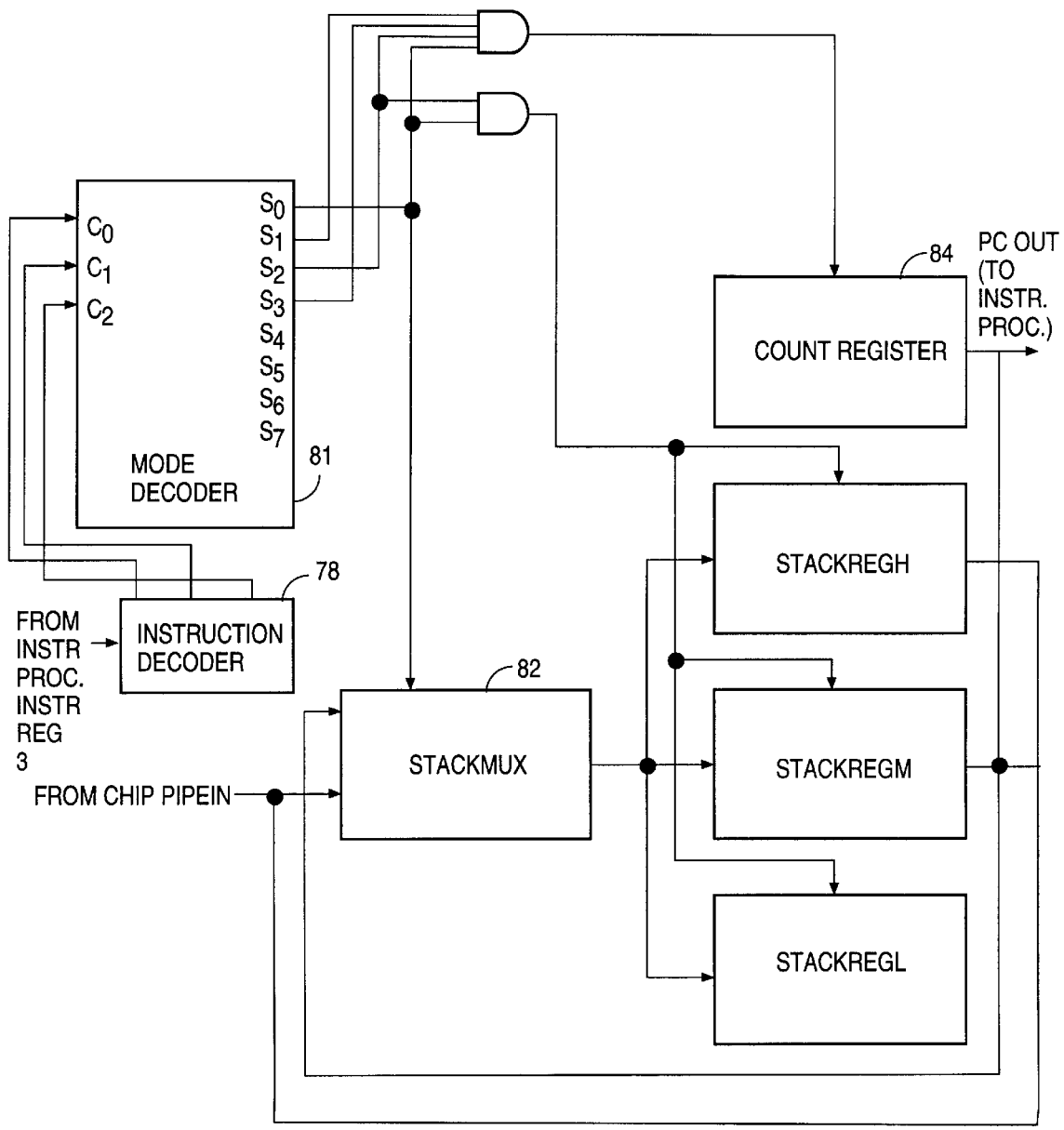
FIG. 8: Accelerator chip program counter block diagram.

The accelerator chip's program counter is shown in FIG. 8. It includes a mode decoder 81 that determines whether to operate the program counter as a shift resister, set a value, increment a value, enter or return from a subroutine, or loop program execution over one or more instructions based on signals from instruction decoder 78. StackMux 82 is used to control push and pop operations in a subroutine stack, i.e., StackRegL, StackRegM and StackRegH. Count register 84 is used to store a loop count for repeated operations. There is also a stack for loop counts to implement nested loops. By placing loop counting in hardware, the accelerator provides for very efficient looping without software overhead. Subroutines may be nested and, moreover, a subroutine need not return to the instruction following the subroutine call to provide added flexibility.

Pipeline Processor

Figure 9:
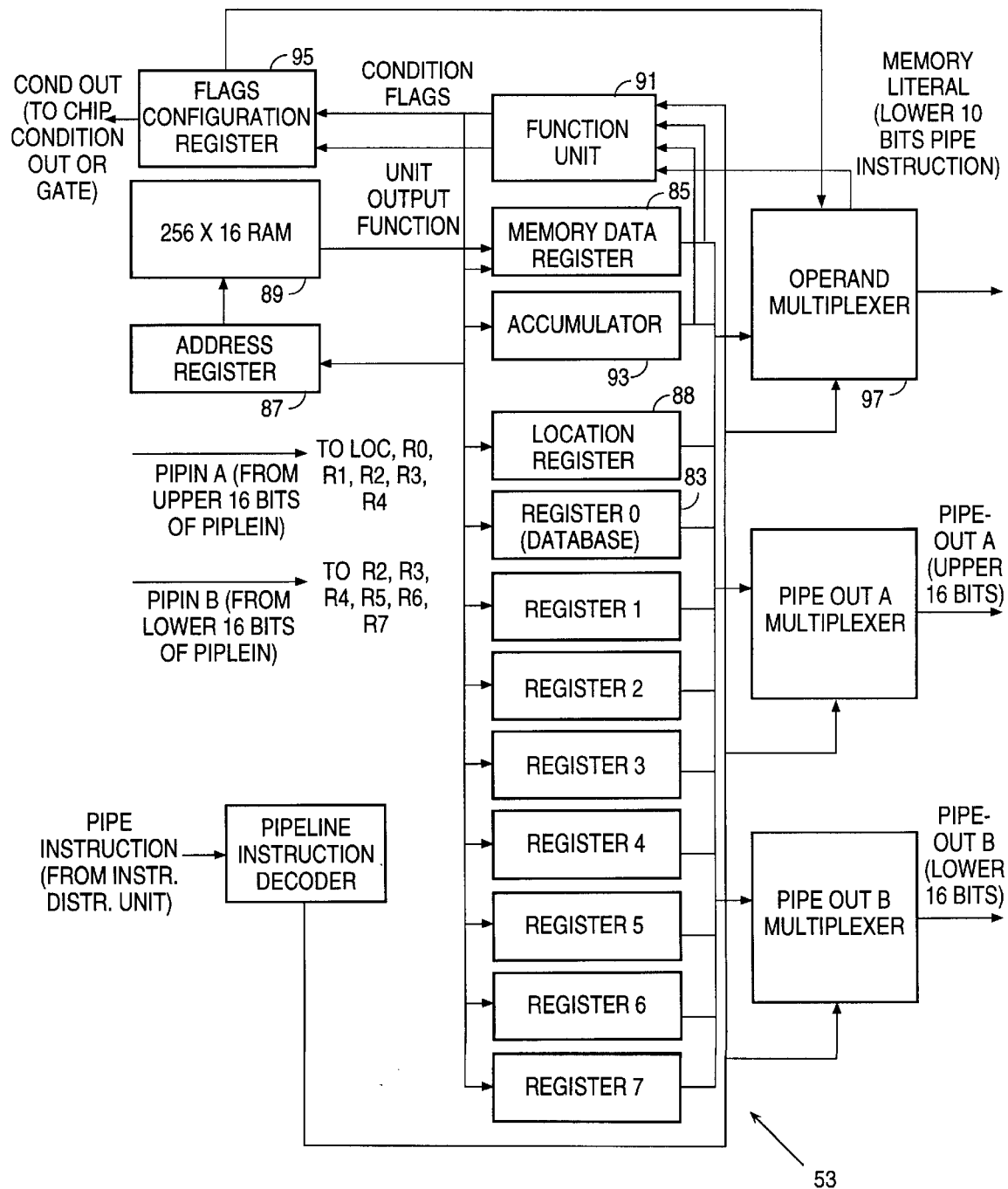
FIG. 9: Pipeline processor block diagram.

Each of the accelerator's pipeline processors 53 contains a number of general purpose registers (Register 1–7) and special purpose registers (database register 83, also referred to as Register 0, memory data register 85, address register 87 and location register 88), a 256×16 scratchpad memory 89, and a function unit 91 as shown in FIG. 9. Operations may be performed with either 16-bit or 32-bit precision on both signed and unsigned data. Values stored in memory may be 8-bit, 16-bit or 32-bit values. Signed values have an explicit representation for negative infinity. When used in comparisons, negative infinity is smaller than any finite value. The sum of any value with negative infinity is always negative infinity and is not considered to be the same as an underflow condition. An overflow condition will occur if negative infinity is subtracted from any value or if the result of an operation cannot be represented with the available number of bits. Negative infinity is represented by the largest negative value representable in 2's complement arithmetic. For example, this number is −32,768 for 16-bit single precision arithmetic.

The function unit 91 takes inputs from three sources: the accumulator 93, one of the general-purpose registers R0–R7, or memory data register 85. Other registers are accessible in diagnostic mode. Results are returned to the accumulator and may also be sent back to a general purpose register or stored in memory. For efficient computation of dynamic programming algorithms, the function unit performs the following 15 operations.

max(Acc,Reg+Mem)
    max(Acc+Mem,Reg)
    max(Acc,Reg)+Mem
    Mem (used for loading memory literals or for transferring memory contents to a register)
    max(Mem,Reg)

Mem+Reg

Mem−Reg

Acc (transfers accumulator back to itself, implementing a no-op) max(Acc,Mem)

Acc+Mem

Acc−Mem

Reg (transfer a source register to the accumulator and a destination register if specified)

max (Acc, Reg)

Acc+Reg

Acc−Reg where Mem is the contents of memory, Acc is the accumulator contents, and Reg is the contents of a specified source register, and max is the maximum value function. The function unit is designed to return the maximum representable value when an overflow occurs during addition. Similarly, when an underflow occurs, the function unit will return the minimum representable signed or unsigned value, depending on operating mode.

The flags and configuration register 95 holds processor configuration information, the function unit condition flag, and intermediate results. Configuration information specifies whether the particular processor is enabled, the type of arithmetic to use (signed or unsigned), whether the processor will operate in normal mode or as a boundary processor, and whether the boundary value to use will be zero or negative infinity. Configuration information is typically loaded as a literal in the operand multiplexer 97 which selects the lower ten bits of the pipeline instruction. The flags and configuration register also holds the carry-out value of arithmetic operations for use in double precision arithmetic. Finally, the condition flag is set when a greater than comparison is performed and the result is true or when an equality comparison is performed and the result is true. The condition flags from each pipeline processor are OR'd together to produce a pipeline segment Condition Out. The four pipeline segment conditions are OR'd to produce a single chip Cond Out.

The location register 88 holds the query position at which a score value is determined to be a maximum. Each pipeline processor in the chip has a unique hardware identification. When a hit is triggered, this value is transferred automatically to the location register. The location register is updated under two conditions: register 7 is selected as the destination register for a result and the condition flag from the function unit has the value "true." A typical instruction that updates the location register has the form: R7=max(Acc,R7). Thus, whenever R7 is replaced with a larger value, the location register will be updated to reflect the location of that new value.

Register R0 holds the current database character. The character is stored in the lower 12 bits of the register. The upper 4 bits are flags associated with the character that control arithmetic operations as described in detail below. For example, these bits indicate whether the character is the first or last in the data.

Register R1 may be used for general storage operations. It is also used as the high-order half of the accumulator when double-precision arithmetic is performed. All remaining registers may be used for general storage.

Referring again to FIG. 9, the contents of registers 0–7 (R0–R7) and the location register 88 may be shifted downstream in the pipeline. Two shift paths (PipeOut A and PipeOut B in FIG. 9) are available for shifting. Path A connects to location, R0, R1, R2, R3 and R4 registers. Path B connects to registers R2, R3, R4, R5, R6 and R7. A shift path may also select no register implying that it is not used for shifting. The shift operation loads the data on the A and B input paths into the registers specified for A and B shifting. Similarly, data from the selected A and B path registers are shifted out to the next pipeline processor. In shift mode, data from the right-most pipeline processor is sent off-chip to become the shift input for the next chip. An offset is automatically added to the query location at the chip output to accommodate a unique location identification in multichip configurations.

The accelerator hardware explicitly supports two boundary values: zero and negative infinity. Boundary values are needed in the computations for the initial row and column of the result matrix. When the value in a source register refers to a boundary condition, the value of that register will be replaced by the boundary value. The boundary value is determined by a bit in flags and configuration register 95. When unsigned arithmetic is specified, a boundary value of negative infinity is automatically converted to zero because negative infinity cannot be represented by an unsigned value. The hardware automatically determines whether a boundary value should be used based on whether a character appears at the beginning of a document and whether the processor is the first in the pipeline.

The pipeline processor supports four memory addressing modes as follows:

Base mode: the address is equal to the base address specified in the pipeline instruction stored in a pipeline instruction register (InstrReg0–3 in FIGS. 7a–7b). This mode is used to access parameters stored in a fixed location.

Index mode: the address is the sum of the base address specified in the pipeline instruction and the low-order byte from a specified general-purpose register R0–R7.

Data mode: the address is the sum of the base address specified in the pipeline instruction and the low-order byte in the database register 83. This mode of addressing is used to access character-dependent scoring parameters.

Flags mode: the address is the sum of the base address specified in the pipeline instruction and two of the flag bits in the database register 83. The flag bits are interpreted as follows:

The current character is neither the first nor the last character of a data document.

The current character is the last in a data document.

The current character is the first in a data document.

The current character is the sole character in a single-character data document.

This addressing mode is used to access small tables that contain position-dependent scoring parameters.

Result Processor

The accelerator's result processors examine score and location data that are shifted through the pipeline and capture score and location information when score data falls above programmable upper and lower thresholds. The result processor also determines the maximum score that occurred above the two thresholds.

The result processors operate in one of four modes as determined by chip inputs. In Idle mode, the result processor's internal registers and hit collection triggers are disabled. In load mode, the internal registers are configured into a shift register to allow configuration data on the chip's pipeline inputs to be sent to the result processor. In run mode, the result processor uses thresholds and state information (described below) to determine whether to capture hits. Finally,in hit collection mode, the result processor extracts hit data from its internal hit memory and shifts the hit data to the next result processor. The outputs from the last result processor on the accelerator chip are connected to the chip output multiplexer to enable shifting configuration and hit data to the next chip.

Figure 10:
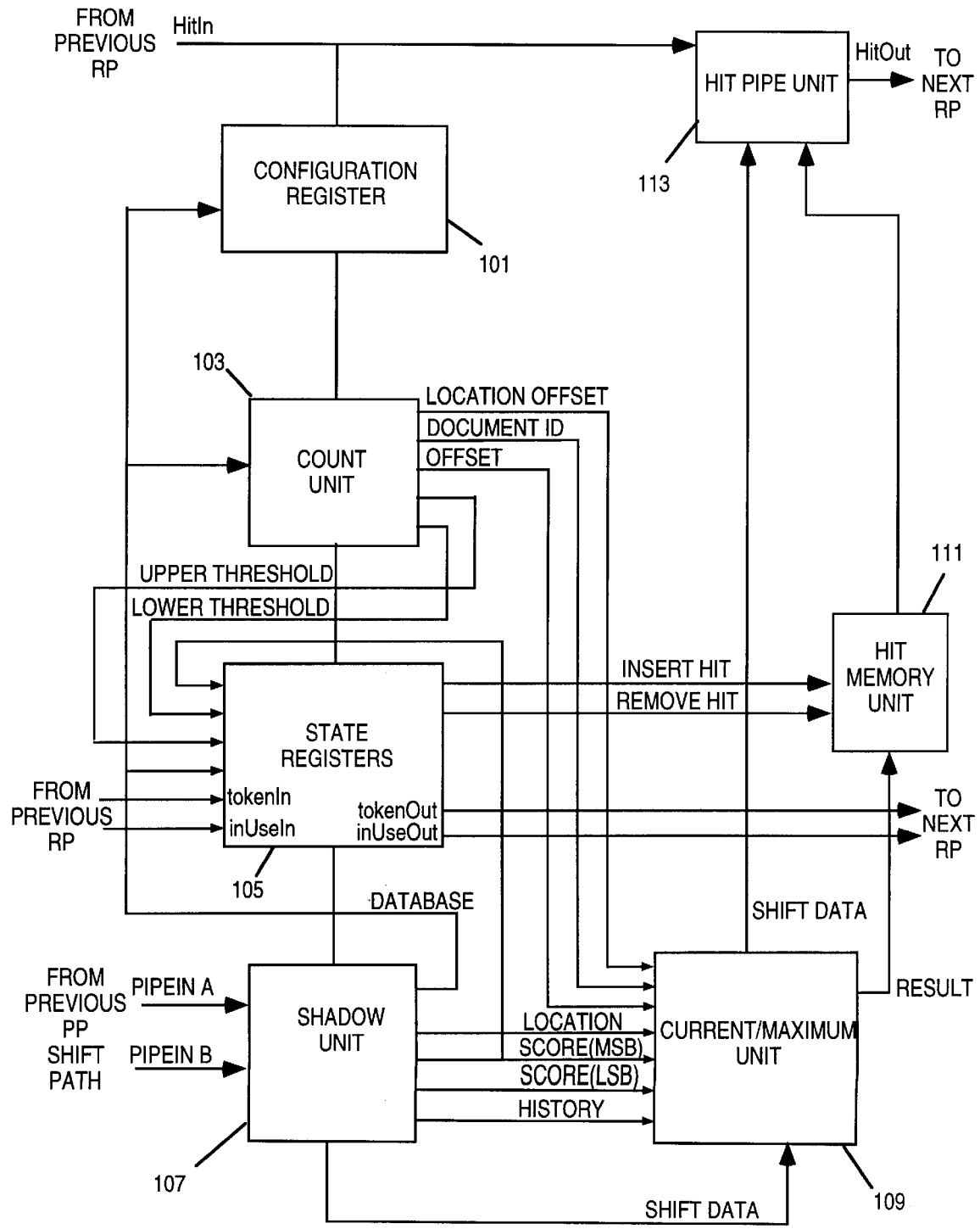
FIG. 10: Result processor block diagram.

A block diagram of a result processor is shown in FIG. 10. Each result processor receives a tokenin and inusein from the previous result processor in the pipeline. The signals to the first result processor in a chip come from chip inputs. TokenIn and inUsein to the first chip in the pipeline come from the PCON. When the pipeline boards are used as independent pipelines, inUsein to the first chip in the pipeline is set to zero. When the pipeline boards are connected into a single long pipeline, the PCON connects the inUseout of the first board to the inUsein of the second board and the inUseOut of the second board to the inUsein of the third board. Each result processor sends tokenOut and inUseOut to the next result processor. Tokens are used to signal a result processor that it has permission to place results on the Hit pipeline, comprising HitIn and HitOut. HitIn comes from the previous result processor and HitOut goes to the next result processor. HitIn of the first result processor comes from the chip pipeline inputs, HitOut of the last result processor goes to the chip pipeline outputs. The inUse flag indicates that the value on the pipeline is a hit. This flag is used to distinguish hit information from padding that is clocked through the pipeline.

Each result processor has an internal hit memory 111 that is used to store captured pipeline results. A signal is sent to chip output pins by a result processor when a hit is available, when hit memory is 75% full, and when hit memory is full. These signals are used by PCON logic as previously discussed to trigger a collection mode that sends captured data to the PCON and eventually to the host computer.

Result processors are initialized by configuration parameters as discussed above. These parameters indicate when to capture data, what data to capture, and format of that data. Configuration information is saved in the Configuration Register 101. Three bits in this register select one of eight result formats; other bits determine how location information is reported, whether a query number is returned instead of location information, whether signed or unsigned arithmetic is used, and whether to return scores that fall above a threshold, cross a threshold, or are a maximum as described below with reference to FIG. 12.

Figure 11:
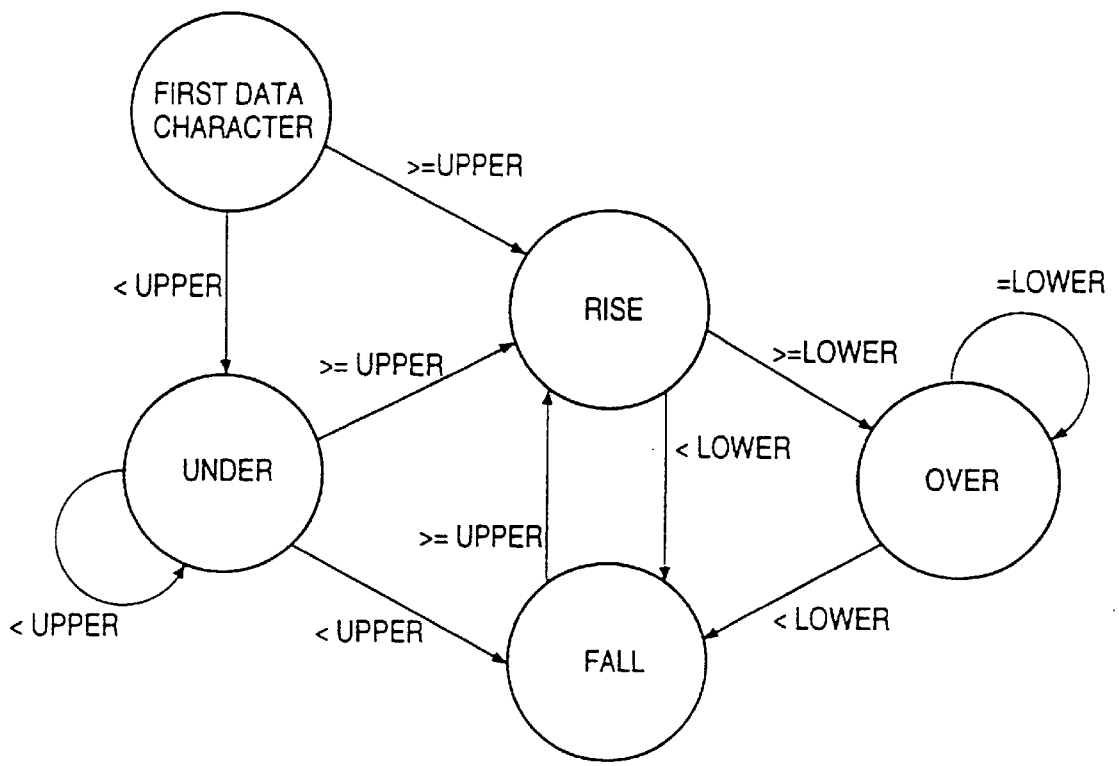
FIG. 11: Current/maximum state diagram.
Figure 12:
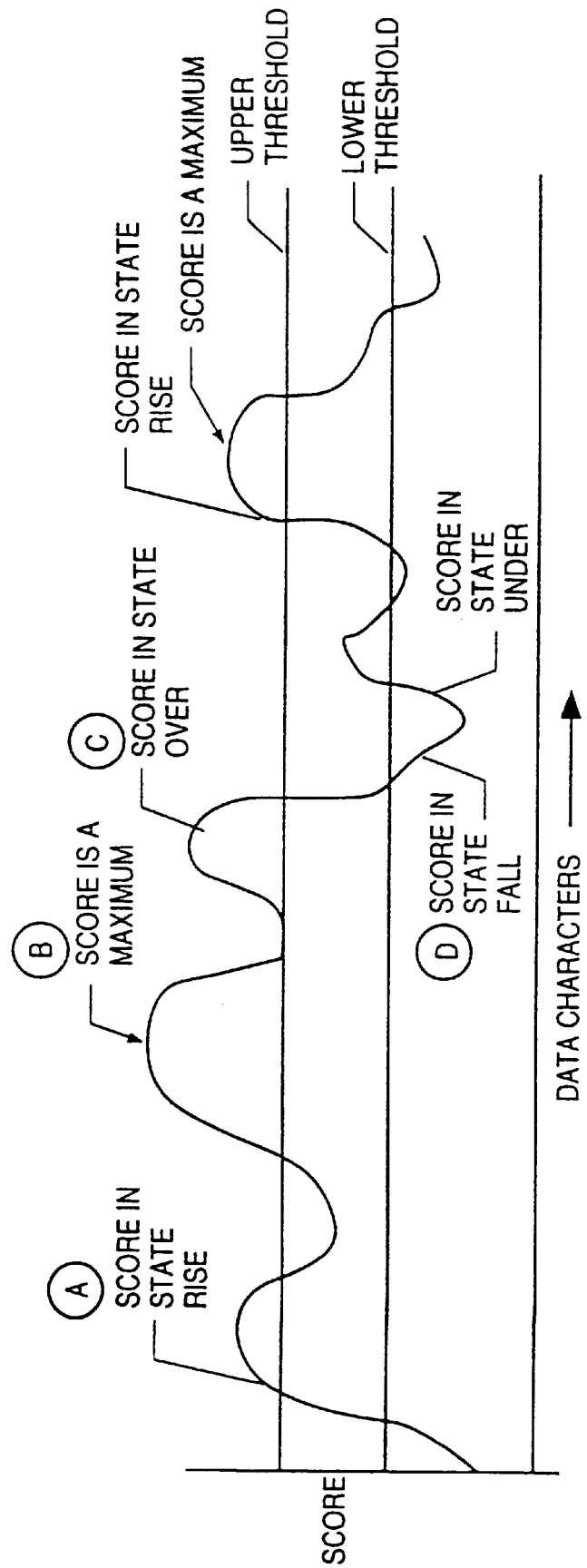
FIG. 12: Example of current/maximum state transitions.

The count unit 103 keeps track of the location in the database corresponding to a given score as well as which database item is associated with that score. Threshold values are also stored in the count unit. The upper and lower threshold values are each formed as the sum of a query-dependent component and a database-dependent component. Location offset is the offset from the beginning of a query associated with the given score value saved in the shadow unit 107. Document ID is the corresponding document number for the given score. OFFSET is the offset from the beginning of the document. Upper and Lower thresholds are values used to determine whether to capture a given score and corresponding position information. The state registers 105 hold the query number (needed when multiple queries are simultaneously searched), location and best score associated with a given query and database item. Signal Insert HIT triggers HIT memory 111 to insert a new hit. Remove HIT triggers HIT memory to delete a hit. The shadow unit 107 holds a copy of the pipeline's database, location, and score registers as well as the previous score (HISTORY). This information is used in the result processor to compare the latest score information with the current best score information stored in the result processor's current/maximum unit 109. The current/maximum unit determines whether the current score from the pipeline is better than the current best score and whether the current result satisfies the collection conditions. The current/maximum unit implements a five-state sequential circuit shown in FIG. 11. The "first" state is entered when the first database character is applied. The interpretation of the remaining states in FIG. 11 is shown in the example of FIG. 12. In the example at A, the score is in the "rise" state when it first exceeds the upper threshold. After first exceeding the upper threshold, a score remains in the "over" state until it falls beneath the lower threshold, shown at D in the example. A maximum score is the largest score obtained while in "rise" or "over" state. This is shown at B in the example. The score will be in the "over" state at C as long as it remains above the lower threshold. This behavior allows for hysteresis to prevent declaring the local maximum at C a true maximum. The score is in the state "fall" when it drops below the lower threshold and is in state "under" until it subsequently rises above the upper threshold. This operation allows the result processor to report local, or non-optimum maximum values.

The shift path through the shadow unit, current/maximum unit and Hit pipe unit is used to load initialization parameters in the result processor.

Operation

To perform a dynamic programming computation, an application on the host computer places accelerator program and other configuration information into a memory location. By invoking a software driver, this information is sent to through the custom interface 23, to the PCON and pipeline boards. Data sent to the PCON from the custom interface comprises six types of information: instructions to the PCON regarding its operation in collecting hits and whether to replicate data sent to the pipeline; instructions to the pipeline board regarding how to consume data sent by the pipeline, pipeline operational mode, and whether and which data to collect; accelerator programs that are loaded into the accelerator's instruction memory; query and scoring data that are loaded into pipeline processor memory; result processor configuration information that determine the manner and parameters or hit collection; and database data.

A search is conducted by first initializing the pipeline processors. Initialization is performed by loading a program into the accelerator chips that takes data shifted in on the pipeline inputs and placing that data into pipeline processor memory. This data comprises scoring matrices from one or more query strings. Additionally, the result processors are initialized by placing the pipeline into result processor load mode and then shifting the configuration data through the pipeline. Once the initializations are complete, the host computer sends over the code associated with the particular algorithm to perform. This code includes instructions to accept input data form the pipeline. The host then sends data from the local disk through to the pipeline. Results are collected from the pipeline and returned to the host computer. The pipeline hardware associates results with specific queries when multiple queries are searched simultaneously. Result data consists of the best score for the query and data as well as the location in both strings at which that score occurred.

I claim:

1. A pipeline processing system including a pipeline comprising:

a) a plurality of accelerator chips coupled in series, a first and last one of said accelerator chips for coupling to an interface logic, wherein each of said accelerator chips includes:

(i) an instruction processor;

(ii) a plurality of pipeline processor segments coupled in series, each of said pipeline processor segments including:

1) a plurality of pipeline processors coupled in series, each of said pipeline processors having an output and having as one input an output from a preceding pipeline processor, and, as a set of second inputs, a corresponding set of outputs from said instruction processor;

2) a result processor having an output, and having as one input, an output from a prior result processor, and, as a second input, the output from a predetermined one of said plurality of pipeline processors.

2. The pipeline processing system defined by claim 1 further comprising an instruction distribution unit coupled between said instruction processor and said plurality of pipeline processors, said distribution unit adapted to receive an instruction stream from said instruction processor and deliver the instruction stream to said plurality of pipeline processors.

3. The pipeline processing system defined by claim 2 wherein said instruction processor comprises:

a) a random access memory for storing an instruction address and data representing a portion of data to be processed by a corresponding one of said plurality of pipeline processors;

b) a multiplexor coupled to said memory adapted to interpret an operating mode;

c) an adder coupled to said multiplexor adapted to conditionally add an offset to said instruction address;

d) an instruction register coupled to said adder for storing an instruction from said instruction stream to be provided to said distribution unit.

4. The pipeline processing system defined by claim 2 wherein said instruction distribution unit comprises:

a) means for delivering a single instruction stream to all pipeline processors;

b) means for delivering one instruction stream to all even-numbered pipeline processors and to deliver a second independent instruction stream to all odd-numbered pipeline processors;

c) means for delivering four independent instruction streams to the pipeline processors such that every fourth pipeline processor receives the same instruction stream.

5. The pipeline processing system defined by claim 1 further including pipeline support logic, said pipeline support logic comprising:

a) means for capturing intermediate results that are shifted from the end of the pipeline and that would otherwise be discarded, b) means for storing said intermediate results in a memory, c) means for retrieving said intermediate results from said memory, d) means for re-introducing said intermediate results into the beginning of the pipeline.

6. The pipeline processing system defined by claim 1 wherein two separate pipeline output streams are collected from the end of the pipeline and returned to a host computer:

one of said output streams containing values that represent the result of the accelerator;

a second one of said output streams implementing a virtual pipeline for simulating greater capacity by swapping data to a slower medium.

7. The pipeline processing system defined by claim 1 wherein each of said pipeline processors comprises a function unit adapted to perform predetermined operations under control of the instruction processor.

8. The pipeline processing system defined by claim 1 wherein said result processor comprises:

a) a configuration register adapted to indicate types of score comparisons to perform and result format;

b) a count unit coupled to said configuration unit and adapted to maintain a location in a query and data of a maximum score;

c) state registers coupled to said count unit and adapted to compare a current score with an upper and lower threshold and indicate exceeding of the upper threshold or falling below the lower threshold;

d) a shadow unit coupled to said configuration register and said state registers and adapted to retain copies of score and location information from the pipeline for local comparisons;

e) a current/maximum unit coupled to said shadow unit and said count unit and adapted to execute a state machine that indicates whether score trends are rising, falling or are at a maximum value;

f) a hit pipe unit coupled to said current/maximum unit and adapted to send hit data to the next result processor when in hit collection mode;

g) a hit memory unit coupled to said current/maximum unit and adapted to store all results that meet the transition and value comparisons indicated by the configuration register.

9. The pipeline processing system defined by claim 1 wherein said instruction processor operates in one of an SIMD mode, a DIMD mode and a QIMD mode, and:

in said SIMD mode, the instruction processor generates one stream of instructions and all pipeline processors execute an instruction from said instruction stream simultaneously;

in said DIMD mode, the instruction processor generates two independent instruction streams such that even-numbered processors all execute an instruction from one stream, and substantially simultaneously, odd-numbered processors all execute an instruction from the other stream; and in said QIMD mode, the instruction processor generates four independent instruction streams and every fourth processor executes an instruction from a corresponding one of the four instruction streams.

10. The pipeline processing system defined by claim 1 wherein said interface logic comprises:

a pipeline controller adapted to receive two distinct 32-bit wide data streams from a host computer, wherein one of said streams is a command stream which carries commands to the pipeline controller, and a second stream is a data stream which carries data to be searched, the command stream including commands to configure the pipeline processors, to load microcode and other data, and to describe the format of data in the data stream.

11. A method of forming a pipeline for performing pipeline processing comprising the steps of:

a) providing a plurality of accelerator chips coupled in series, a first and last one of said accelerator chips for coupling to an interface logic;

(b) within each of said accelerator chips, providing an instruction processor and a plurality of pipeline processor segments, each of said pipeline processor segments including:
 (1) a plurality of pipeline processors coupled in series, each of said pipeline processors having an output and having as one input an output from a preceding pipeline processor, and, as a set of second inputs, a corresponding set of outputs from said instruction processor, and
 (2) a result processor having an output, and having as one input, an output from a prior result processor, and, as a second input, the output from a predetermined one of said plurality of pipeline processors.

12. The method defined by claim 11 further comprising the step of collecting two separate pipeline output streams from the end of the pipeline and returning the two output streams to a host computer, one stream containing values that represent the result, a second stream implementing a virtual pipeline for simulating greater capacity by swapping data to a slower medium.

13. The method defined by claim 11 further comprising the steps of:
 a) storing an instruction address and data representing a portion of data to be processed by a corresponding pipeline processor;
 b) interpreting an operating mode;
 c) conditionally adding an offset to said instruction address;
 d) storing an instruction to be provided to said corresponding pipeline processor.

14. The method defined by claim 11 further comprising the step of performing predetermined operations under control of the instruction processor.

15. The method defined by claim 11 further comprising the steps of:
 a) indicating types of score comparisons to perform and result format;
 b) maintaining a location in a query and data of a maximum score;
 c) comparing the current score with an upper and lower threshold and indicating an exceeding of the upper threshold or falling below the lower threshold;
 d) retaining copies of score and location information from the pipeline for local comparisons;
 e) executing a state machine that indicates whether score trends are rising, falling or are at a maximum value;
 f) sending hit data to a next result processor when in hit collection mode;
 g) storing all results that meet a transition and value comparisons indicated by a configuration register.

16. The method defined by claim 11 wherein said pipeline processing operates in one of an SIMD mode, a DIMD mode and a QIMD mode, and further comprising the steps of:
 in said SIMD mode, generating one stream of instructions and executing the same instruction simultaneously by a plurality of pipeline processors;
 in said DIMD mode, generating two independent instruction streams and executing an instruction from one stream by one subset of said plurality of pipeline processors, and substantially simultaneously, executing an instruction from the other stream by a second subset of said plurality of pipeline processors; and
 in said QIMD mode, generating four independent instruction streams and executing an instruction from one stream by one subset of said plurality of pipeline processors, executing an instruction from a second stream by a second subset of said plurality of pipeline processors, executing an instruction from a third stream by a third subset of said plurality of pipeline processors, and executing an instruction from a fourth stream by a fourth subset of said plurality of pipeline processors.

17. The method defined by claim 11 further comprising the step of:
 receiving two distinct 32-bit wide data streams from a host computer, wherein one of said streams is a command stream which carries commands to a pipeline controller, and a second stream is a data stream which carries data to be searched, the command stream including commands to configure the pipeline processors, to load microcode and other data, and to describe the format of data in the data stream.

18. A pipeline processing system including a pipeline comprising:
 a) a plurality of accelerator chips coupled in series, a first and last one of said accelerator chips coupled to an interface logic, wherein each of said accelerator chips includes:
   (i) an instruction processor;
   (ii) a plurality of pipeline processor segments coupled in series, each of said pipeline processor segments including:
     1) a plurality of pipeline processors coupled in series, each of said pipeline processors having an output and having as one input an output from a preceding pipeline processor, and, as a set of second inputs, a corresponding set of outputs from said instruction processor;
     2) a result processor having an output, and having as one input, an output from a prior result processor, and, as a second input, the output from a predetermined one of said plurality of pipeline processors; and
 wherein said interface logic includes:
  b) data paths for conveying information between the accelerator chips and a host computer, including
   (i) a distinct data path for conveying setup and mode selection commands and information describing database format from the host computer to the accelerator pipeline,
   (ii) a distinct data path for conveying database characters from the host computer to the accelerator pipeline,
   (iii) a distinct data path for conveying search results from the accelerator pipeline to the host computer,
   (iv) a distinct data path for conveying data captured from the end of the accelerator pipeline to the host computer.

19. The pipeline processing system defined by claim 18 wherein each of said pipeline processors comprises a function unit adapted to perform predetermined operations under control of the instruction processor.

20. The pipeline processing system defined by claim 18 wherein said result processor comprises:
 a) a configuration register adapted to indicate types of score comparisons to perform and result format;
 b) a count unit coupled to said configuration unit and adapted to maintain a location in a query and data of a maximum score;
 c) state registers coupled to said count unit and adapted to compare a current score with an upper and lower threshold and indicate exceeding of the upper threshold or falling below the lower threshold;

d) a shadow unit coupled to said configuration register and said state registers and adapted to retain copies of score and location information from the pipeline for local comparisons;

e) a current/maximum unit coupled to said shadow unit and said count unit and adapted to execute a state machine that indicates whether score trends are rising, falling or are at a maximum value;

f) a hit pipe unit coupled to said current/maximum unit and adapted to send hit data to the next result processor when in hit collection mode;

g) a hit memory unit coupled to said current/maximum unit and adapted to store all results that meet the transition and value comparisons indicated by the configuration register.

21. The pipeline processing system defined by claim 18 wherein said instruction processor operates in one of an SIMD mode, a DIMD mode and a QIMD mode, and:

in said SIMD mode, the instruction processor generates one stream of instructions and all pipeline processors execute an instruction from said instruction stream simultaneously;

in said DIMD mode, the instruction processor generates two independent instruction streams such that even-numbered processors all execute an instruction from one stream, and substantially simultaneously, odd-numbered processors all execute an instruction from the other stream; and in said QIMD mode, the instruction processor generates four independent instruction streams and every fourth processor executes an instruction from a corresponding one of the four instruction streams.

22. The pipeline processing system defined by claim 18 wherein said interface logic comprises:

a pipeline controller adapted to receive two distinct 32-bit wide data streams from a host computer, wherein one of said streams is a command stream which carries commands to the pipeline controller, and a second stream is a data stream which carries data to be searched, the command stream including commands to configure the pipeline processors, to load microcode and other data, and to describe the format of data in the data stream.

23. The pipeline processing system defined by claim 18 wherein two separate pipeline output streams are collected from the end of the pipeline and returned to a host computer:

one of said output streams containing values that represent the result of the accelerator;

a second one of said output streams implementing a virtual pipeline for simulating greater capacity by swapping data to a slower medium.

* * * * *